United States Patent
Kumagai

(10) Patent No.: US 7,350,805 B2
(45) Date of Patent: Apr. 1, 2008

(54) AIRBAG DEVICE

(75) Inventor: Masayoshi Kumagai, Shiga (JP)

(73) Assignee: Takata Corporation, Tokyo (JP)

( * ) Notice: Subject to any disclaimer, the term of this patent is extended or adjusted under 35 U.S.C. 154(b) by 251 days.

(21) Appl. No.: 11/020,331

(22) Filed: Dec. 22, 2004

(65) Prior Publication Data

US 2005/0151353 A1 Jul. 14, 2005

(30) Foreign Application Priority Data

Dec. 22, 2003 (JP) ............................. 2003-425167

(51) Int. Cl.
*B60R 21/16* (2006.01)
(52) U.S. Cl. ...................... 280/731; 280/732
(58) Field of Classification Search ................ 280/731, 280/732, 735; 180/273
See application file for complete search history.

(56) References Cited

U.S. PATENT DOCUMENTS

| 6,241,279 B1 * | 6/2001 | Ochiai ........................ 280/735 |
| 6,353,394 B1 | 3/2002 | Maeda et al. |
| 6,373,146 B2 | 4/2002 | Horikoshi et al. |
| 6,452,288 B1 | 9/2002 | Roth et al. |
| 6,490,515 B1 | 12/2002 | Okamura et al. |
| 6,548,804 B1 | 4/2003 | Yuhara et al. |

FOREIGN PATENT DOCUMENTS

| JP | H9-150662 | 6/1997 |
| JP | 2000-016233 | 1/2000 |
| JP | 2000-355264 | 12/2000 |
| JP | 2001-030869 | 2/2001 |
| JP | 2001-074541 | 3/2001 |
| JP | 2001-074575 | 3/2001 |

* cited by examiner

*Primary Examiner*—Faye M. Fleming
(74) *Attorney, Agent, or Firm*—Fitch, Even, Tabin & Flannery

(57) ABSTRACT

An airbag device is provided to prevent an airbag from being deployed or to reduce the deployment force of an airbag when an airbag device or a vehicle-body component adjacent to the airbag device is leaned against by a vehicle occupant. In one form, a passenger-seat airbag device is set in an instrument panel and includes a bracket which is fixed to a vehicle-body member with, for example, a bolt. A strain gauge is attached to the bracket. When a lid covering the front side of a retainer is leaned against by a vehicle occupant, the weight of the occupant is transmitted to the bracket via the retainer, such that a small strain is generated in the bracket. Such a strain is detected by the strain gauge to allow the deployment force of the airbag to be reduced.

18 Claims, 7 Drawing Sheets

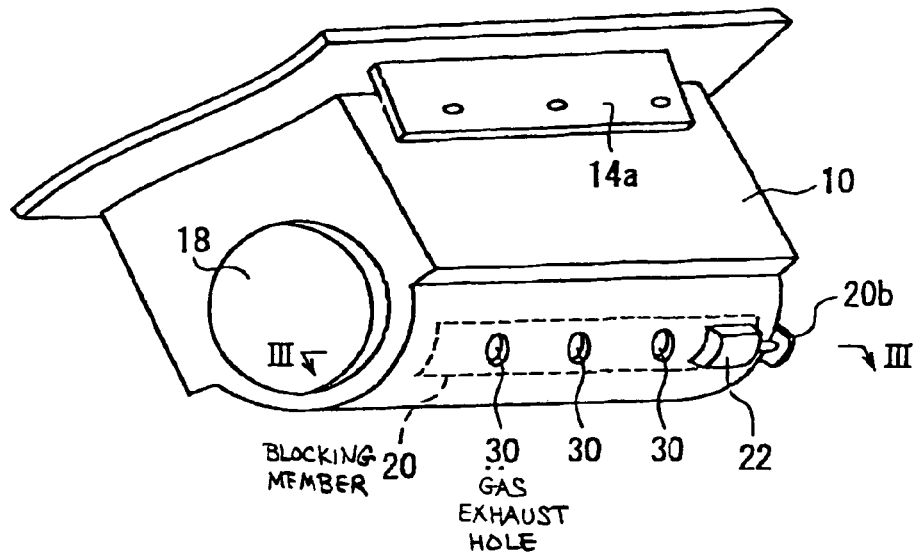
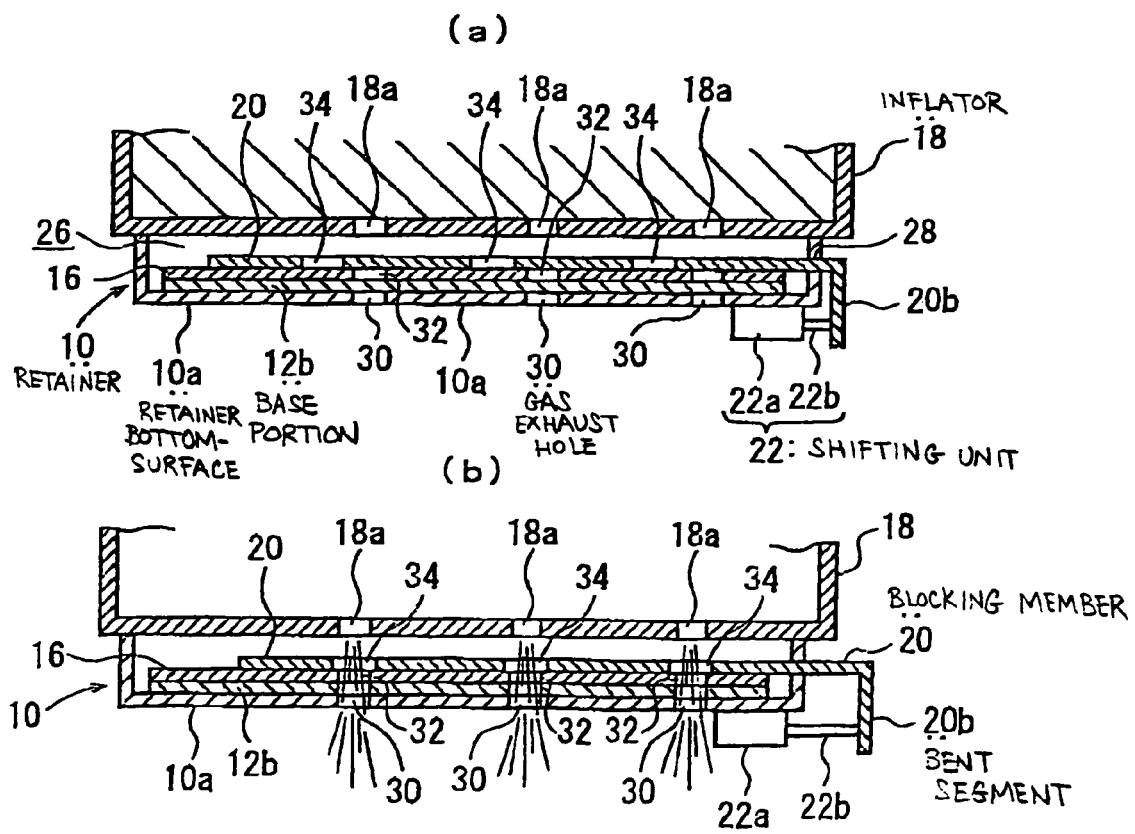
FIG. 3

AIRBAG DEVICE

TECHNICAL FIELD

The present invention relates to airbag devices for protecting occupants in vehicles, and particularly, to an airbag device which detects the state of an occupant in order to control the operation of a gas generator.

BACKGROUND OF THE INVENTION

Referring to FIG. 6 of Japanese Unexamined Patent Application Publication No. 2000-16233, an airbag device is disclosed. Specifically, such an airbag device detects the distance between the body of an occupant in a seat and an instrument panel with, for example, an infrared sensor. If the detected distance is less than a predetermined value, a gas generator in the airbag device is prevented from operating even during a collision, or the deployment force of the airbag is reduced.

SUMMARY OF THE INVENTION

Accordingly, the object of the present invention is to provide an airbag device which is capable of preventing an airbag from inflating or reducing the deployment force of the airbag when the airbag device or an instrument panel adjacent to the airbag device is leaned against by an occupant.

An airbag device according to the present invention includes an airbag; a gas generator for inflating the airbag; and control means for determining a state of a vehicle occupant in front of the airbag device to control the inflation of the airbag. The control means includes a detector for detecting a load applied to the airbag device or a vehicle-body component adjacent to the airbag device from the vehicle occupant so as to determine the state of the vehicle occupant.

Furthermore, according to the airbag device of the present invention, the detector may comprise a strain gauge.

Furthermore, according to the airbag device of the present invention, the detector preferably detects the displacement of the airbag device or the adjacent vehicle-body component caused when the vehicle occupant applies a load to the airbag device or the vehicle-body component.

Furthermore, the vehicle-body component adjacent to the airbag device may comprise one of an instrument panel, a vehicle-body member, a steering member, a bracket, or a bolt.

According to the airbag device of the present invention, when the airbag device or the adjacent vehicle-body component is leaned against by a vehicle occupant, a load is applied to the airbag device or the vehicle-body component from the vehicle occupant, and such a load is detected by the detector. Based on the detection, the control means, for example, prevents the gas generator from operating during a collision, or reduces the deployment force of the airbag by decreasing the amount of gas generated by the gas generator. Alternatively, the control means may also reduce the deployment force of the airbag by releasing some of the gas from the gas generator outward so as to decrease the amount of gas introduced into the airbag.

A strain gauge is suitable for the detector means due to being cheap and having a simple structure. Alternatively, the detector may be a displacement sensor which can detect the displacement of the airbag device or the adjacent vehicle-body component.

The present invention is suitable for passenger-seat and driver-seat airbag devices, but may also be used as, for example, a back-seat airbag device or a side airbag device. The vehicle-body component adjacent to the airbag device may be, for example, an instrument panel, a vehicle-body member, a steering member, a bracket, or a bolt.

BRIEF DESCRIPTION OF THE DRAWINGS

FIG. 2 is a perspective diagram viewed from the back of the airbag device in FIG. 1.

FIG. 3 includes a cross-sectional view (a) taken along line III-III in FIG. 2, and a diagram (b) illustrating the same cross-section as (a), but illustrating a state in which gas is released through exhaust holes.

DETAILED DESCRIPTION OF THE PREFERRED EMBODIMENTS

Figure 1:
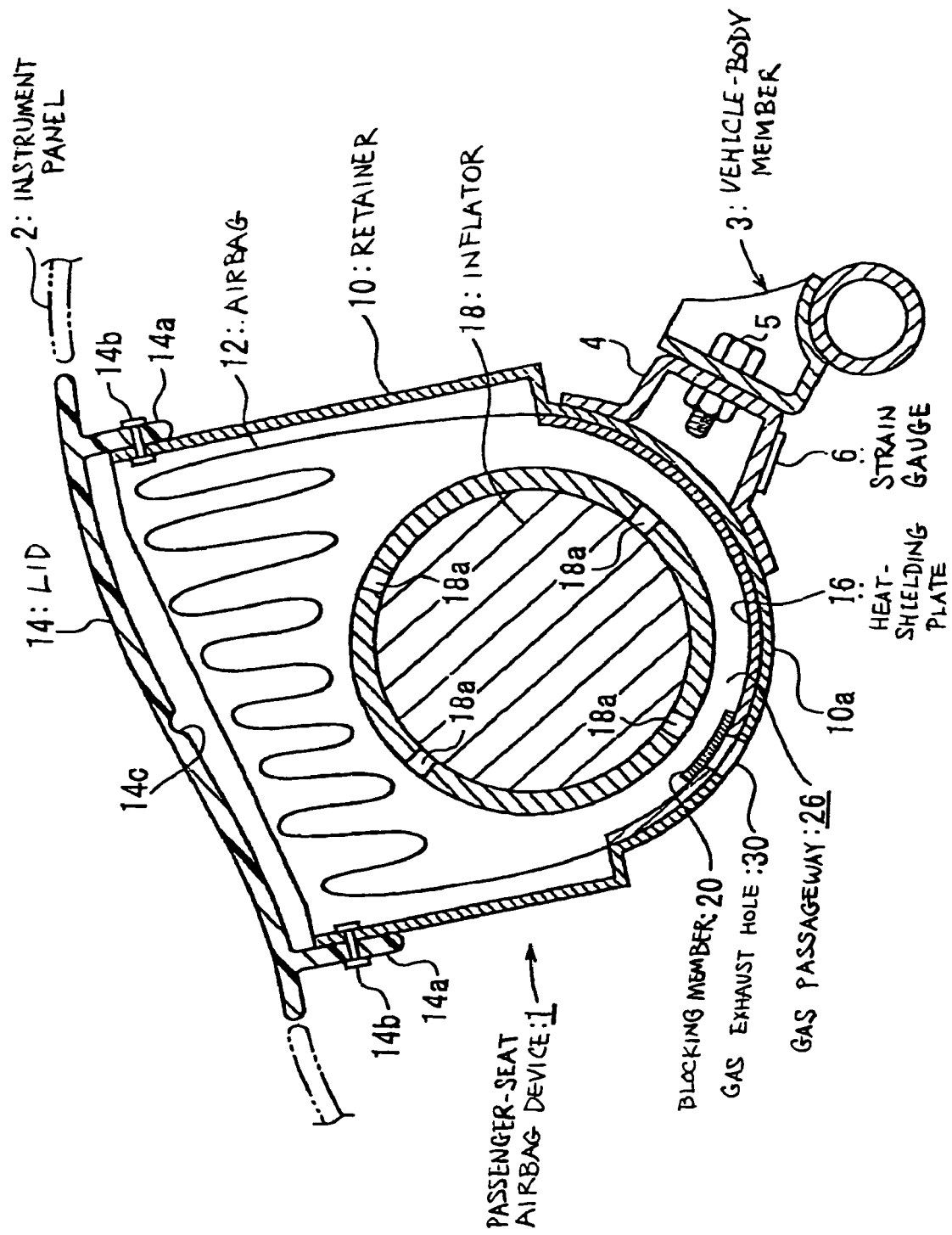
FIG. 1 is a cross-sectional view of a passenger-seat airbag device according to a first embodiment.

Embodiments will now be described with reference to the drawings. FIG. 1 is a cross-sectional view of an airbag device according to a first embodiment of the present invention. FIG. 2 is a perspective diagram viewed from the back of the airbag device. FIG. 3(a) is a cross-sectional view taken along line III-III in FIG. 2. FIG. 3(b) illustrates the same cross-section as FIG. 3(a), but illustrates a state in which gas is released through exhaust holes.

According to the first embodiment, an airbag device 1 is for a passenger seat and is set in an instrument panel 2. The airbag device 1 includes a bracket 4 which is fixed to a vehicle-body member (reinforcing member) 3 with, for example, a bolt 5. Moreover, a strain gauge 6 is attached to the bracket 4.

In the first embodiment, when a gas generator is activated, the airbag device 1 releases some of the generated gas out of a retainer via gas exhaust holes depending on the state of a vehicle occupant, such that the deployment force of an airbag can be controlled. The structure of the airbag device 1 will be described below in detail.

The passenger-seat airbag device 1 includes a retainer 10 functioning as a casing; an airbag 12 folded inside the retainer 10; a lid 14 for covering an opening at the front side of the retainer 10; a heat-shielding plate 16 disposed in the airbag 12; a cylindrical inflator 18 functioning as the gas generator for generating gas for inflating the airbag 12; a blocking member 20 for closing off gas exhaust holes 30; and a shifting unit 22 for shifting the blocking member 20. The bracket 4 is fixed to the retainer 10 by, for example, welding.

The lid 14 has leg portions 14a which are fastened to the retainer 10 via fasteners 14b, such as rivets. The lid 14 is provided with a tearing line 14c.

The upper side of the retainer 10 in FIG. 1 has an opening, which is covered with the lid 14. The lid 14 is flush with the instrument panel 2 surrounding the lid 14.

Referring to FIG. 3, the airbag 12 has a base portion 12b, which is disposed between the heat-shielding plate 16 and a retainer bottom-surface 10a. Thus, the airbag 12 is combined with the retainer 10. The heat-shielding plate 16 is fixed to the retainer 10 with, for example, rivets (which are not shown in the drawings).

Furthermore, the outer periphery surface of the inflator 18 and the heat-shielding plate 16 form a space (gas passageway) 26 therebetween.

One of the side surfaces of the retainer 10 is provided with a slit opening 28 (FIG. 3) through which the blocking member 20 extends. The blocking member 20 is inserted into the retainer 10 through the slit opening 28 and is disposed on the heat-shielding plate 16. One end of the blocking member 20 in the longitudinal direction is bent into an L-shape so as to form a bent segment 20b.

The retainer bottom-surface 10a is provided with a plurality of the gas exhaust holes 30 at positions where each hole 30 overlaps the blocking member 20. The gas exhaust holes 30 are disposed at a predetermined interval in the longitudinal direction of the blocking member 20. The base portion 12b of the airbag 12 covers the gas exhaust holes 30.

The heat-shielding plate 16 is provided with gas outflow holes 32 each corresponding to one of the gas exhaust holes 30.

Similarly, the blocking member 20 is provided with gas outflow holes 34 at the same interval as the gas exhaust holes 30 in the longitudinal direction of the blocking member 20. In the normal state (that is, when the airbag 12 is not inflated), the holes 34 are positioned such that they do not overlap the gas exhaust holes 30.

The shifting unit 22 is attached to the outer side of the retainer bottom-surface 10a of the retainer 10. In the first embodiment, the shifting unit 22 includes a cylinder 22a and a rod 22b protruding outward from the cylinder 22a. The protruding end of the rod 22b is fixed to the bent segment 20b of the blocking member 20. The cylinder 22a contains a piston and an explosive. When the explosive is ignited with an igniter (which is not shown in the drawings), a pressure is applied to the piston such that the rod 22b is driven outward in the protruding direction. The present invention is not limited to such an explosive-actuator mechanism, and alternatively, other linear-actuator mechanisms, such as a solenoid mechanism, may be used.

A detection signal from the strain gauge 6 is input to a controller (which is not shown in the drawings) for the inflator 18 and the shifting unit 22 via a wire harness (which is not shown in the drawings). A detection signal from a vehicle-collision sensor (which is not shown in the drawings) is also input to the controller.

When a vehicle occupant leans against the lid 14, the weight of the occupant is transmitted to the bracket 4 via the retainer 10, such that a small strain is generated in the bracket 4. Such a strain is detected by the strain gauge 6.

In such an airbag device 1, if the vehicle collides with an object at a predetermined speed or higher and the vehicle occupant is not in contact with the lid 14, the inflator 18 is activated and the gas is released through gas emission holes 18a. The gas pressure allows the airbag 12 to start inflating and thus forces the lid 14 to be ripped along the tearing line 14c. As a result, the airbag 12 becomes inflated inside the vehicle cabin.

In this case, since the occupant is not in contact with the lid 14, the shifting unit 22 is not activated, and the entire volume of gas emitted through the gas emission holes 18a enters the airbag 12. This allows for quick inflation of the airbag 12 and high inner pressure in the airbag 12. Since the gas exhaust holes 30 are closed off by the blocking member 20 and are covered by the base portion 12b of the airbag 12, the base portion 12b in this case functions as a gasket so as to prevent gas leakage through the gas exhaust holes 30. The entire volume of gas emitted through the gas emission holes 18a at the bottom side of the inflator 18 is introduced into the airbag 12 via the gas passageway 26.

On the other hand, if the vehicle collides with an object at a predetermined speed or higher in a state where leaning of the vehicle occupant against the lid 14 is detected by the strain gauge 6, the shifting unit 22 is activated to shift the rod 22b in the protruding direction so as to reduce the amount of gas that is introduced into the airbag 12.

Accordingly, as shown in FIG. 3(b), the blocking member 20 is shifted such that the gas outflow holes 34, the gas outflow holes 32, and the gas exhaust holes 30 are aligned with one another. As a result, the gas emitted through the gas emission holes 18a reaches the base portion 12b of the airbag 12 via the holes 34 and 32. The temperature and pressure of the emitted gas cause the base portion 12b to be blown out so that the gas emitted through the gas emission holes 18a at the bottom side of the inflator 18 is discharged from the gas exhaust holes 30. Consequently, this reduces the amount of gas introduced into the airbag 12 so that the airbag 12 is inflated at a relatively slower rate and the inner pressure in the airbag 12 is reduced to a relatively lesser value.

In the first embodiment, although the deployment force of the airbag 12 is reduced when the lid 14 is leaned against by the vehicle occupant, the inflator 18 may alternatively be set in a manner such that the inflator 18 is not activated if it is determined that the lid 14 is pressed against with a strong force by the body of the occupant such that the load received by the lid 14 from the occupant is higher than a predetermined value.

Furthermore, in the first embodiment, although the deployment force of the airbag 12 is reduced by discharging gas outward through the gas exhaust holes 30, such a reduction of the deployment force may alternatively be performed by providing a plurality of inflators and activating only a certain number of the inflators. As a further alternative, an output-adjustable multilevel inflator may be used such that the deployment force of the airbag 12 may be reduced by decreasing the output amount from the inflator. Moreover, instead of reducing the deployment force of the airbag 12 with the inflator, the inflator may be set in a manner such that the inflator is not activated.

According to the first embodiment, although the strain gauge 6 is attached to the bracket 4, the strain gauge 6 may alternatively be disposed in the retainer 10. In a case where an attachment member is disposed between the retainer 10 and the lid 14, the strain gauge 6 may be disposed on this attachment member. Moreover, if the instrument panel 2 surrounding the lid 14 is formed of a lined, high-rigid material, such as a metallic material, the strain gauge 6 may alternatively be disposed on this high-rigid material.

An airbag device according to a second embodiment of the present invention will now be described with reference to FIG. 4.

A passenger-seat airbag device 41 includes a retainer 42 functioning as a casing and having a substantially rectangular shape in plan view; an airbag 43 folded inside the retainer 42; and an inflator 44 for inflating the airbag 43. The upper side of the retainer 42 has an opening, which is covered with an instrument panel 45.

The undersurface of the instrument panel 45 is provided with a groove-like tearing line (fragile portion) 45a and a pair of hinge portions 45b which are parallel to each other.

The opening at the upper side of the retainer 42 faces a section as a lid between the two hinge portions 45b.

The undersurface of the instrument panel 45 has cranked instrument-panel connection members 46 attached thereto.

Two opposite sides of the retainer 42 each have an L-shaped retainer connection member 47 attached thereto.

Each connection member 46 is disposed on the corresponding connection member 47 and is tightly joined to the connection member 47 with a bolt 48 and a nut 49.

A pair of strain gauges 50 is attached to the respective connection members 47.

The retainer 42 is provided with the bracket 4, which is fixed to the vehicle-body member 3 with the bolt 5.

The inflator 44 in the second embodiment is a multilevel inflator.

Similar to the first embodiment, if a vehicle occupant leans against the instrument panel 45 adjacent to the airbag device 41, the strain gauges 50 detect the load, and the inflator 44 is prevented from operating or the amount of gas to be generated is reduced.

When the inflator 44 is activated and the airbag 43 is in the process of inflating, the instrument panel 45 becomes ripped along the tearing line 45a. Thus, the section of the instrument panel 45 between the hinge portions 45b opens towards the vehicle cabin while each hinge portion 45b acts as an axis of rotation. As a result, the airbag 43 becomes deployed in the vehicle cabin.

Figure 4:
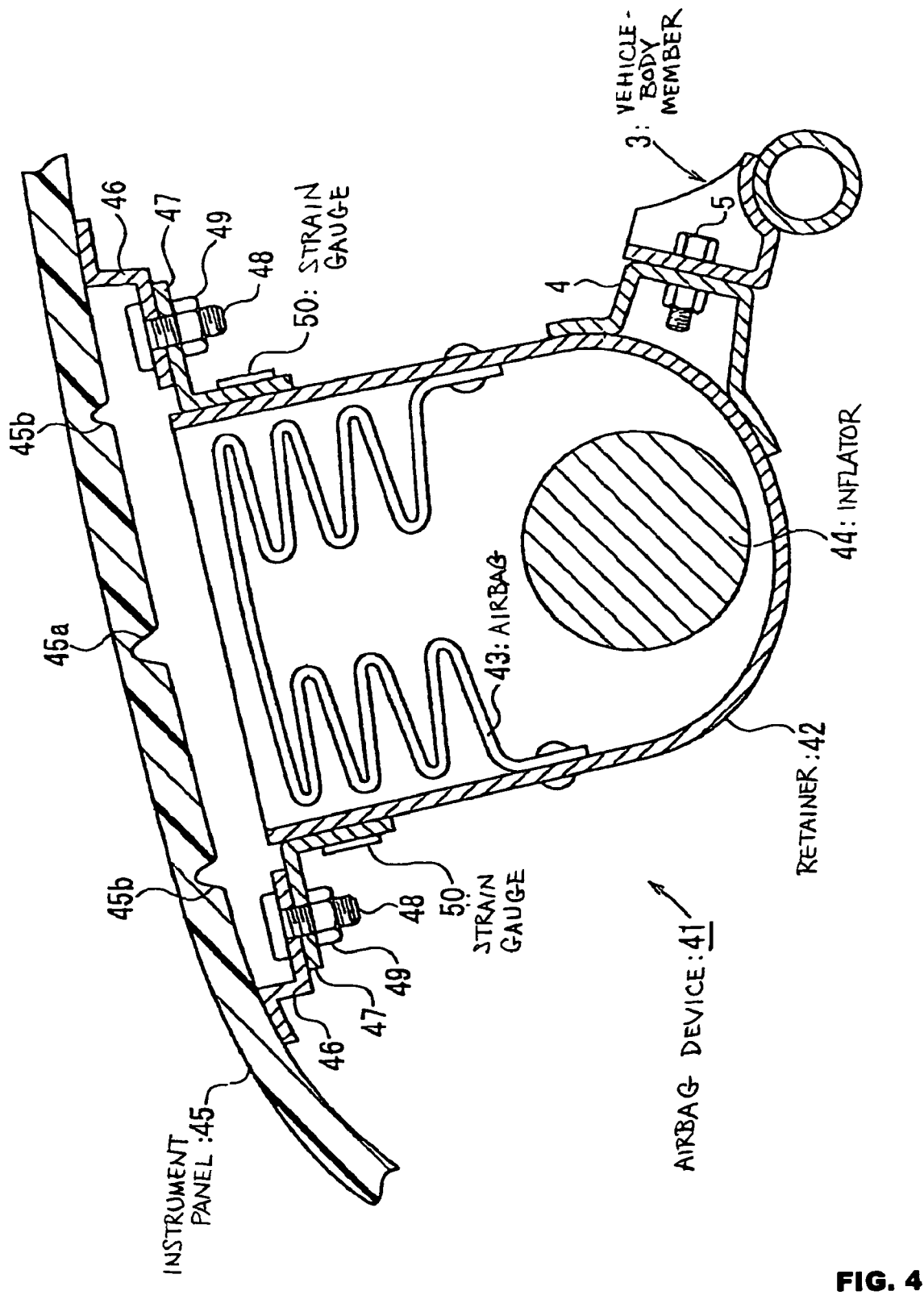
FIG. 4 is a cross-sectional view of an airbag device according to a second embodiment.

In FIG. 4, although the strain gauges 50 are disposed on the corresponding retainer connection members 47, the strain gauges 50 may alternatively be disposed on the connection members 46. As a further alternative, the strain gauges 50 may be disposed in the retainer 42 or on the bracket 4.

Figure 5:
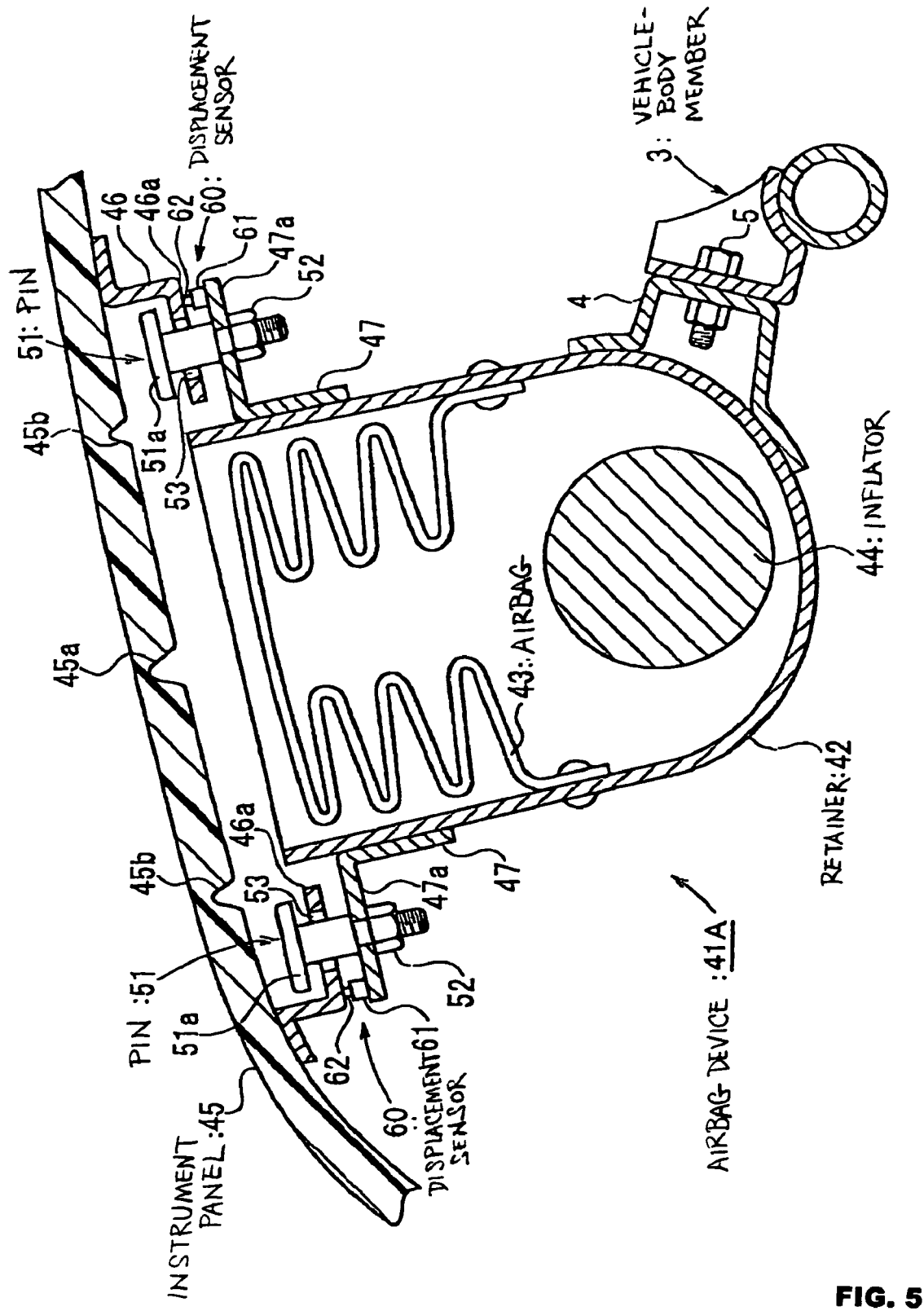
FIG. 5 is a cross-sectional view of an airbag device according to a third embodiment.

FIG. 5 is a cross-sectional view of an airbag device 41A according to a third embodiment of the present invention.

In the third embodiment, a segment 46a of each instrument-panel connection member 46 and a segment 47a of each retainer connection member 47 are separated by a predetermined distance while the two segments face each other. The segments 46a and 47a extend substantially parallel to the instrument panel 45.

A bottom end of a pin 51 is fixed to each segment of one of the pairs of connection members (that is, each segment 47a in the third embodiment) with a nut 52. Each pin 51 extends through a hole 53 provided in the corresponding segment 46a and stands substantially perpendicular to the corresponding segment 47a and the instrument panel 45. A top end of each pin 51 is provided with a flanged portion 51a. Each flanged portion 51a has a larger diameter than the corresponding hole 53, and therefore, cannot be inserted through the hole 53. Thus, each segment 46a is only capable of moving back and forth between the corresponding flanged portion 51a and the corresponding segment 47a.

Two displacement sensors 60 are each disposed between the corresponding set of segments 46a and 47a. Each displacement sensor 60 detects the displacement of the corresponding set of segments 46a and 47a in the approaching direction. In the third embodiment, the displacement sensors 60 are electrical-capacitive sensors and are each provided with a pair of electrodes. Each displacement sensor 60 includes a main body 61 attached to the corresponding segment 47a; a movable component 62 which is capable of moving into and out of the main body 61 and is formed of a ferroelectric material; and a resilient member (which is not shown in the drawings), such as a spring, for biasing the movable component 62 towards the segment 46a. The movable component 62 is resiliently in contact with the segment 46a. A strain gauge is not provided in the airbag device 41A. Other elements in the airbag device 41A are the same as those in the airbag device 41, and the same elements are indicated by the same reference numerals.

In the airbag device 41A, when a vehicle occupant leans against the instrument panel 45, the instrument panel 45 moves toward the retainer 42 (downward direction of the drawing in FIG. 5) and causes the movable components 62 of the displacement sensors 60 to be pressed into the corresponding main bodies 61. According to the pressed distance of each movable component 62, the electrical capacitance of the corresponding displacement sensor 60 changes, whereby the amount of displacement of the instrument panel 45 is detected. If such an amount of displacement exceeds a predetermined value, the amount of gas to be emitted from the inflator 44 during a collision is reduced or the gas emission itself is prevented. Alternatively, in a case where the amount of displacement exceeds a first predetermined value, i.e. a relatively low value, the inflator 44 may operate in a low-output mode. On the other hand, in a case where the amount of displacement exceeds a second predetermined value, i.e. a relatively high value, the inflator 44 may either be set in a non-operative mode or operate in an extremely-low-output mode.

Although electrical-capacitive sensors are used as the displacement sensors 60 in FIG. 5, other types of displacement sensors, such as differential transformers and Doppler sensors, may be used as alternatives.

Figure 8:
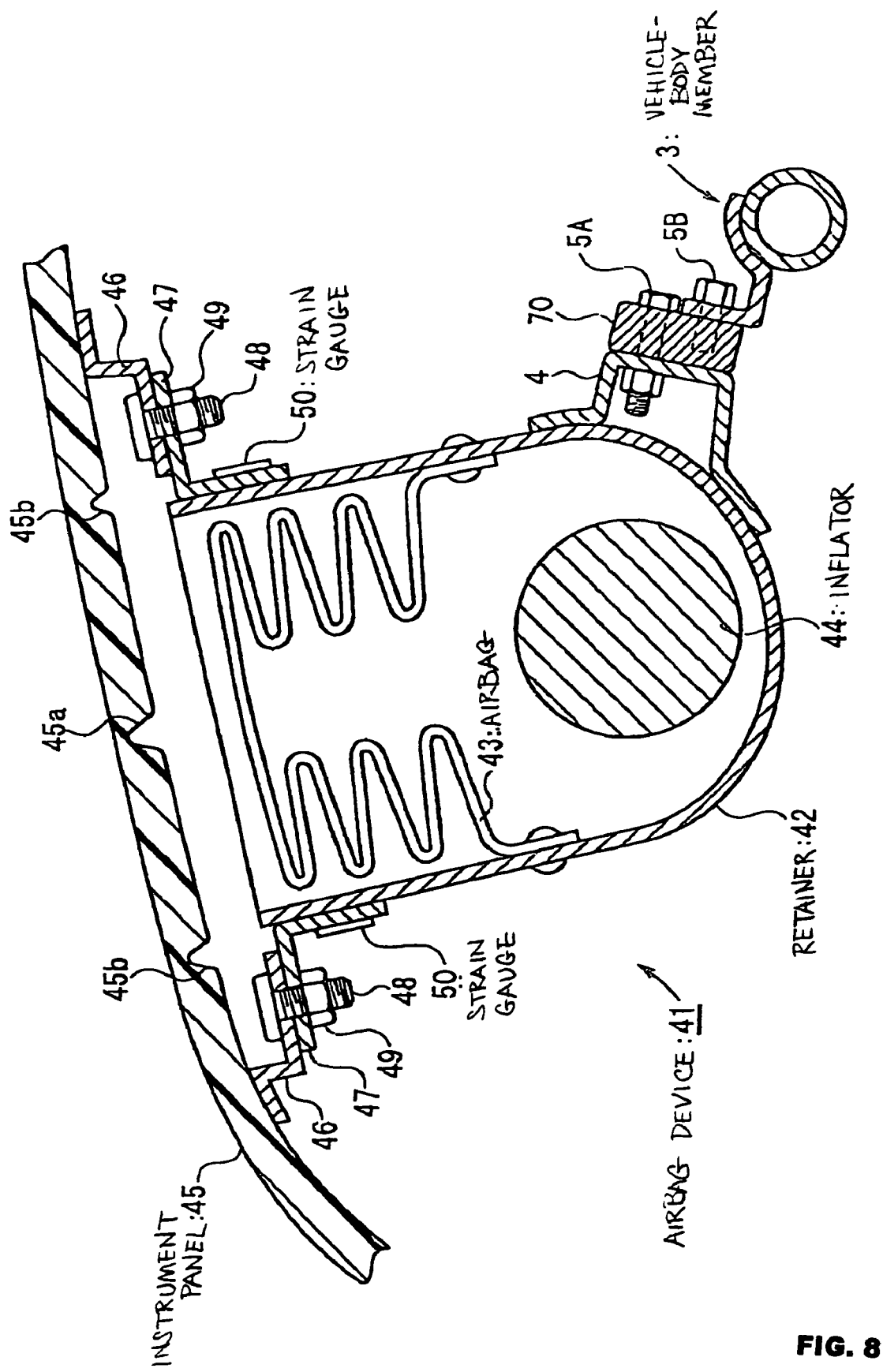
FIG. 8 is a cross-sectional view of a passenger-seat airbag device according to an alternative embodiment.

In the present invention, referring to FIG. 8, a strain sensor or a displacement sensor 70 may alternatively be disposed between the bracket 4 and the vehicle-body member 3. In this case, the leaning of a vehicle occupant against the lid or the instrument panel, for example, may be detected based on the output from the displacement sensor 70. In FIG. 8, the displacement sensor 70 is fixed to the bracket 4 with a bolt 5A, and is attached to the vehicle-body member 3 with a bolt 5B. Although the strain gauges 50 are provided in FIG. 8, the strain gauges 50 may alternatively be omitted.

Specifically, FIG. 8 is an alternative example of the second embodiment of FIG. 4 in which the structure of the second embodiment is further provided with the displacement sensor 70. Similarly, as a further alternative, the structure of the first embodiment of FIGS. 1 and 2 may also be provided with the displacement sensor 70 between the bracket 4 and the vehicle-body member 3.

Figure 6:
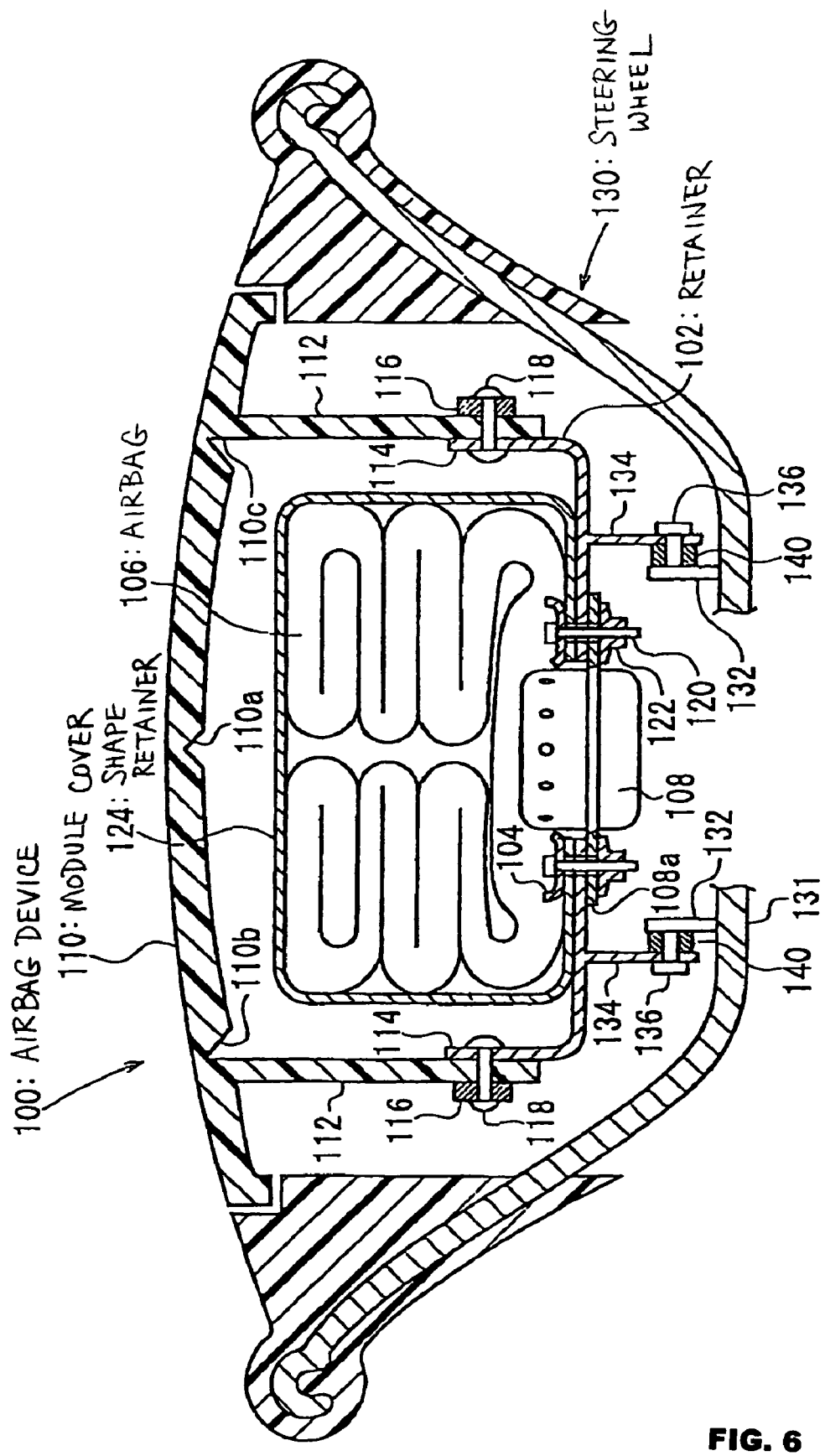
FIG. 6 is a cross-sectional view of a driver-seat airbag device according to a fourth embodiment.
Figure 7:
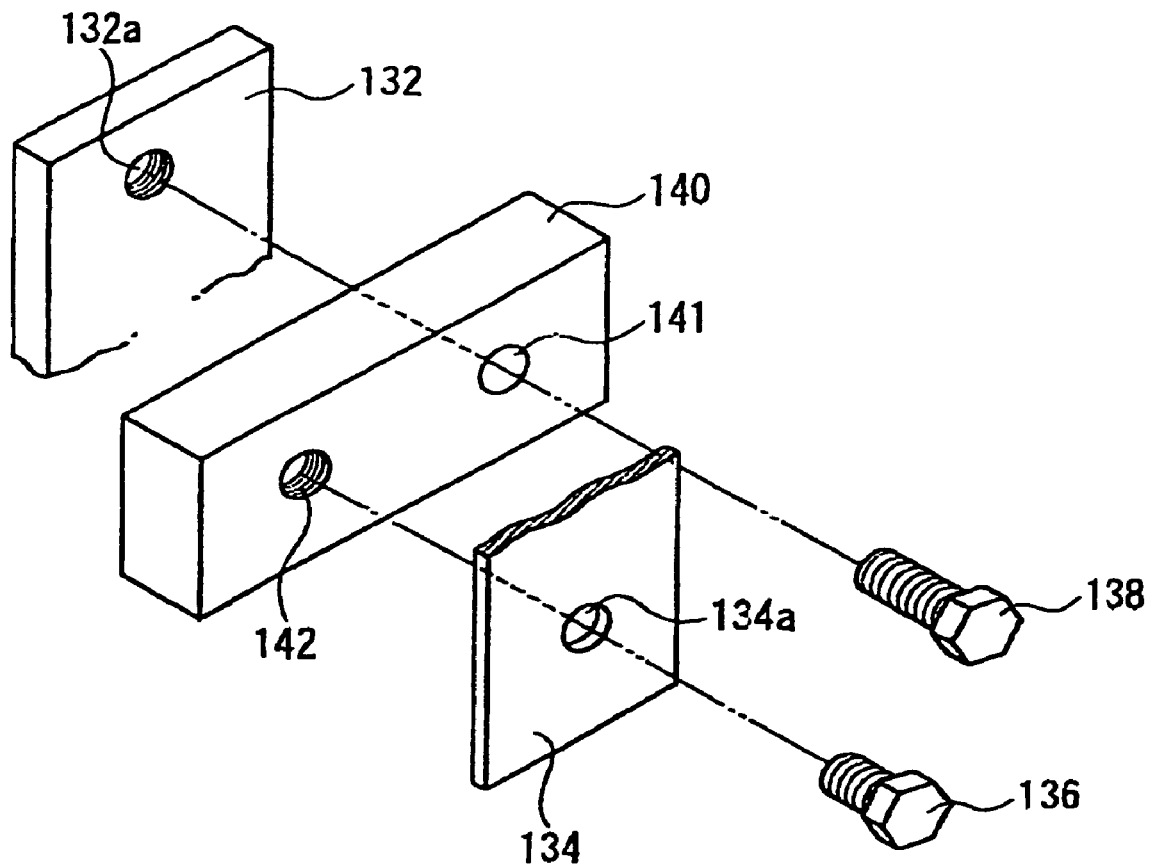
FIG. 7 is an exploded perspective view illustrating a part of the structure in FIG. 6.

FIG. 6 is a cross-sectional view of a driver-seat airbag device 100 according to a fourth embodiment of the present invention. FIG. 7 is an exploded perspective view illustrating the connecting portion between a retainer and a steering member.

The driver-seat airbag device 100 includes, for example, a retainer 102; an airbag 106 mounted to the retainer 102 via an airbag-attachment ring 104; an inflator 108 for inflating the airbag 106; and a module cover 110 which covers the folded airbag 106. The module cover 110 is provided with a tearing line 110a and a pair of hinge grooves 110b and 110c.

The module cover 110 has a pair of sidewalls 112 protruding from its undersurface. On the other hand, the retainer 102 also has a pair of sidewalls 114 which are bent forward from the retainer 102. Each sidewall 114 is fixed to the corresponding sidewall 112 with a rivet 118 via a washer 116.

The inflator 108 has a flange 108a. Bolts 120, which protrude from the airbag-attachment ring 104, extend through the retainer 102 and the flange 108a and are tightly coupled with corresponding nuts 122 so as to fix the inflator 108 and the airbag 106 to the retainer 102.

The folded shape of the airbag 106 is maintained by a shape retainer 124. There are cases where this shape retainer 124 is not provided.

A base (steering base) 131 of a steering wheel 130 is provided with brackets 132 which are projected upward from the base 131. On the other hand, the retainer 102 has leg segments 134 projected downward from its undersurface. Each of the leg segments 134 has leaning-force detecting means 140, such as a strain gauge or a displacement sensor, attached thereto with a corresponding bolt 136. Such detecting means 140 is fixed to the corresponding bracket 132 on the steering wheel 130 with a corresponding bolt 138.

As shown in FIG. 7, in the fourth embodiment, each detecting means 140 has a through-hole 141 and a screw-hole 142. On the other hand, each leg segment 134 has a through-hole 134a, and each bracket 132 has a screw-hole 132a. Each bolt 136 extends through the corresponding through-hole 134a and is screwed into the corresponding screw-hole 142. On the other hand, each bolt 138 extends through the corresponding through-hole 141 and is screwed into the corresponding screw-hole 132a. Alternatively, nuts may be provided in place of the screw-holes 132a and 142, and in that case, the screw-holes 132a and 142 may act as through-holes.

According to such a driver-seat airbag device 100, if the steering wheel 130 is not leaned against by a vehicle occupant, the airbag device 100 performs the normal operation when the vehicle is involved in a collision. In other words, the inflator 108 emits gas so as to inflate the airbag 106, and in the process of inflating, the airbag 106 pushes, rips and opens the module cover 110.

In contrast, if the steering wheel 130 is leaned against by a vehicle occupant, the detecting means 140 detects the leaning force. Based on the detection, a control circuit (which is not shown in the drawings) for the inflator 108 prevents the inflator 108 from operating.

The inflator 108 may be a multilevel inflator such that when the steering wheel 130 is leaned against by a vehicle occupant, the inflator 108 operates in a low-output mode, whereas, when the steering wheel 130 is not leaned against by a vehicle occupant, the inflator 108 operates in a high-output mode.

Alternatively, like the airbag device shown in FIGS. 1 to 3, the airbag device 100 may be provided with a gas-exhaust mechanism including gas exhaust holes, a blocking member, and a shifting unit for the blocking member. In that case, when the steering wheel 130 is leaned against by a vehicle occupant, the gas may be released through the gas exhaust holes during the operation of the inflator.

The technical scope of the present invention is not limited to the above embodiments, and modifications are permissible within the scope of the present invention. The present invention may be used in combination with determination means, such as a seat sensor or an image-capturing device, for determining the state of the vehicle occupant.

What is claimed is:

1. An airbag device for a vehicle, the airbag device comprising:
    an airbag operatively mounted to a predetermined component of the vehicle;
    a gas generator for inflating the airbag with inflation gas; and
    a detector operable to detect a load applied to the predetermined component of the vehicle prior to airbag deployment to allow inflation of the airbag to be controlled based on the applied load.

2. The airbag device of claim 1 including a retaining assembly for mounting the airbag to the predetermined component of the vehicle, and the detector is arranged to detect loads transmitted to the retaining assembly from the predetermined vehicle component.

3. An airbag device for a vehicle, the airbag device comprising:
    an airbag operatively mounted to a predetermined component of the vehicle;
    a gas generator for inflating the airbag with inflation gas; and
    a detector for detecting a load applied to the predetermined component of the vehicle to allow inflation of the airbag to be controlled based on the applied load, wherein the detector comprises one of a strain gauge and a displacement sensor.

4. The airbag device of claim 1 including a retainer to which the airbag is secured, the retainer having gas exhaust apertures, and an aperture blocking device that includes an aperture blocking member for being shifted between a blocking position relative to the retainer gas exhaust apertures with no applied load detected by the detector for providing the airbag with an entire volume of inflation gas from the gas generator, and an open position relative to the retainer gas exhaust apertures with an applied load detected by the detector for reducing an inflation rate of the airbag.

5. The airbag device of claim 4 wherein the airbag includes a portion secured to the retainer extending over the gas exhaust apertures, and with the blocking member shifted to the open position the gas generator is arranged to emit inflation gas with sufficiently high temperature and pressure to breach material of the airbag portion aligned with the gas exhaust apertures.

6. The airbag device of claim 1 wherein the gas generator has different levels of inflation gas output to allow the inflation gas output to be reduced with detection of an applied load by the detector.

7. In combination, a vehicle including an airbag device, the combination comprising:
    a predetermined component of the vehicle;
    an airbag operatively mounted to the predetermined component of the vehicle;
    a gas generator for inflating the airbag with inflation gas; and
    a detector for detecting a load applied to the predetermined component of the vehicle to allow inflation of the airbag to be controlled based on the applied load, wherein the predetermined component of the vehicle includes one of an instrument panel and a steering wheel.

8. A vehicle having a passenger compartment, the vehicle comprising:
    an instrument panel in the vehicle passenger compartment;
    a steering wheel in the vehicle passenger compartment;
    an airbag device associated with at least one of the instrument panel and the steering wheel and having an airbag for being inflated in the passenger compartment during vehicle emergency conditions; and
    a lean force detector of the airbag device that detects a load applied by a passenger engaging and leaning against the one of the instrument panel and the steering wheel.

9. The vehicle of claim 6 wherein the airbag device includes a retainer assembly for the airbag and having a cover that includes an outer surface which is integrated with the one of the instrument panel and the steering wheel with the detector determining loads applied against the integrated cover outer surface.

10. The vehicle of claim 6 wherein the lean force detector comprises one of a strain gauge and a displacement sensor.

11. The vehicle of claim 8 wherein the airbag device includes a gas generator for supplying inflation gas to the airbag and arranged closely adjacent a portion of the airbag, and a blocking device between the gas generator and the airbag portion that is shifted upon detection of the load applied by the passenger to the one of the instrument panel and the steering wheel to expose the airbag portion so that inflation gas emitted from the gas generator breaches the airbag portion to reduce inflation rate of the airbag.

12. The vehicle of claim 11 wherein the blocking device comprises a retainer having apertures, a heat shield having apertures aligned with the retainer apertures with the airbag portion being between the retainer and heat shield, and a blocking member overlying the heat shield and having apertures with shifting of the blocking device comprising shifting of the blocking member to move the blocking member apertures into alignment with the aligned retainer and heat shield apertures for exposing the airbag portion aligned with the aligned apertures to the inflation gas from the gas generator.

13. The vehicle of claim 6 wherein the airbag device has a gas generator having different levels of inflation gas output to allow the inflation gas output to be reduced with detection of an applied load by the lean force detector.

14. The vehicle of claim 6 wherein the airbag device includes a retainer assembly for the airbag for substantially rigidly securing the airbag device to the one of the instrument panel and the steering wheel so that loads applied thereto are transmitted to the retainer assembly, and the lean force detector comprises a strain gauge mounted to the retainer assembly for detecting strain in the retainer assembly generated by the applied load to the one of the instrument panel and steering wheel.

15. The vehicle of claim 6 wherein the airbag device includes a retainer assembly having a pair of members that shift relative to each with the applied load to the one of the instrument panel and steering wheel, and the lean force detector comprises a displacement sensor mounted between the pair of retainer assembly members for detecting relative shifting thereof.

16. The vehicle of claim 11 wherein the displacement sensor comprises one of an electrical-capacitive sensor, a differential transformer sensor, and a Doppler sensor.

17. The vehicle of claim 12 wherein the electrical capacitive sensor includes a moveable member biased toward one of the pair of retainer assembly members and a main body mounted on the other of the pair of retainer assembly members and into which the moveable member is pushed against the bias thereof upon application of a load to the one of the instrument panel and the steering wheel.

18. The vehicle of claim 6 wherein the airbag device includes a retainer assembly for the airbag and having a retainer and mounting members with portions of adjacent ones of the mounting members arranged to extend substantially parallel to each other and transverse to a surface of the instrument panel or steering wheel so that loads applied to the surface cause the parallel portions to shift relative to each other, and the lean force detector is mounted between the parallel portions of the mounting members.

* * * * *

UNITED STATES PATENT AND TRADEMARK OFFICE
CERTIFICATE OF CORRECTION

| | | |
|---|---|---|
| PATENT NO. | : 7,350,805 B2 | Page 1 of 1 |
| APPLICATION NO. | : 11/020331 | |
| DATED | : April 1, 2008 | |
| INVENTOR(S) | : Masayoshi Kumagai | |

It is certified that error appears in the above-identified patent and that said Letters Patent is hereby corrected as shown below:

Claim 9, Column 9, line 1, delete "claim 6" and insert --claim 8-- therefor.

Claim 10, Column 9, line 7, delete "claim 6" and insert --claim 8-- therefor.

Claim 13, Column 9, line 31, delete "claim 6" and insert --claim 8-- therefor.

Claim 14, Column 9, line 35, delete "claim 6" and insert --claim 8-- therefor.

Claim 15, Column 10, line 8, delete "claim 6" and insert --claim 8-- therefor.

Claim 16, Column 10, line 15 (approximately), delete "claim 11" and insert --claim 15-- therefor.

Claim 17, Column 10, line 18 (approximately), delete "claim 12" and insert --claim 16-- therefor.

Claim 18, Column 10, line 26, delete "claim 6" and insert --claim 8-- therefor.

Signed and Sealed this

Twenty-ninth Day of July, 2008

JON W. DUDAS
*Director of the United States Patent and Trademark Office*